United States Patent [19]
Hester

[11] 3,974,477
[45] Aug. 10, 1976

[54] PNEUMATIC PRESSURE MONITORING SYSTEM

[76] Inventor: Sam R. Hester, 814 Tarpon Drive, Fort Walton Beach, Fla. 32548

[22] Filed: May 9, 1974

[21] Appl. No.: 468,280

[52] U.S. Cl. ............................... 340/58; 200/61.25
[51] Int. Cl.² .......................................... B60C 23/02
[58] Field of Search ............ 340/58, 57; 200/61.22, 200/61.25, 61.26

[56] References Cited
UNITED STATES PATENTS

| | | | |
|---|---|---|---|
| 2,629,086 | 2/1953 | Ainsworth et al. | 340/58 |
| 3,093,812 | 6/1963 | Brown | 340/58 |
| 3,374,460 | 3/1968 | Massoubre | 340/58 |
| 3,602,884 | 8/1971 | Brumbelow | 200/61.22 X |
| 3,614,732 | 10/1971 | Lejeune | 340/58 |

*Primary Examiner*—Alvin H. Waring
*Attorney, Agent, or Firm*—Pugh & Keaty

[57] ABSTRACT

An improved tire pressure monitoring system and method for detecting, for example, high pressure or low pressure of automobile tires utilizing uniquely designed magnetic coupling means for transmitting the tire high or low pressure from the rotating tire to the relatively stationary, non-rotating portion of the vehicle for indication of the state of the pressure on the operating panel of the vehicle. The novel tire pressure monitoring system is usually located on the wheel and brake drum assembly for all types of vehicles, monitoring the pressure for the appropriate vehicle tire (FIG. 1). The system includes a means for monitoring the pressure in the pneumatic tire, usually coupled directly to the tire stem. The system also includes an electrical conductor from the pneumatic pressure monitor means to ferrous core means, the composition of whose core is a material that has a relative normal permeability that is high, which is mounted on the rotating wheel hub and for which the electrical conduction means is wound around the ferrous core means forming a coil for the ferrous core means. The system also includes permanent magnet means mounted on the non-rotation axle of the wheel which magnetically couples to said ferrous core means to transmit any changes of said pressure monitoring means from the rotating tire to the relatively stationary (non-rotating) portion of the vehicle and transmits this information to alarm circuit means. The switch assembly means includes pick off coil means wrapped around the permanent magnet means to transmit signals from the pressure monitor means to the alarm circuit means by detecting changes in permeability of the ferrous core means, based on the principle of Lenz's Law.

16 Claims, 6 Drawing Figures

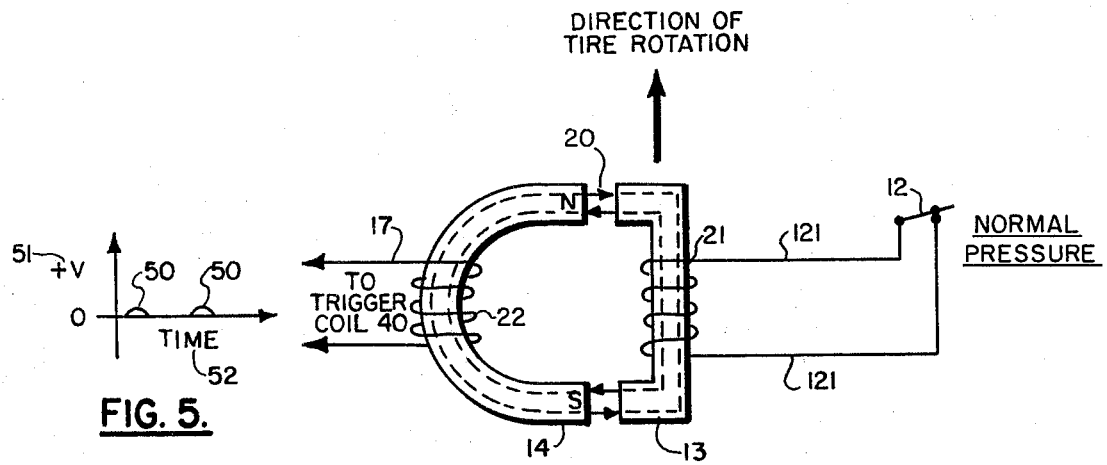
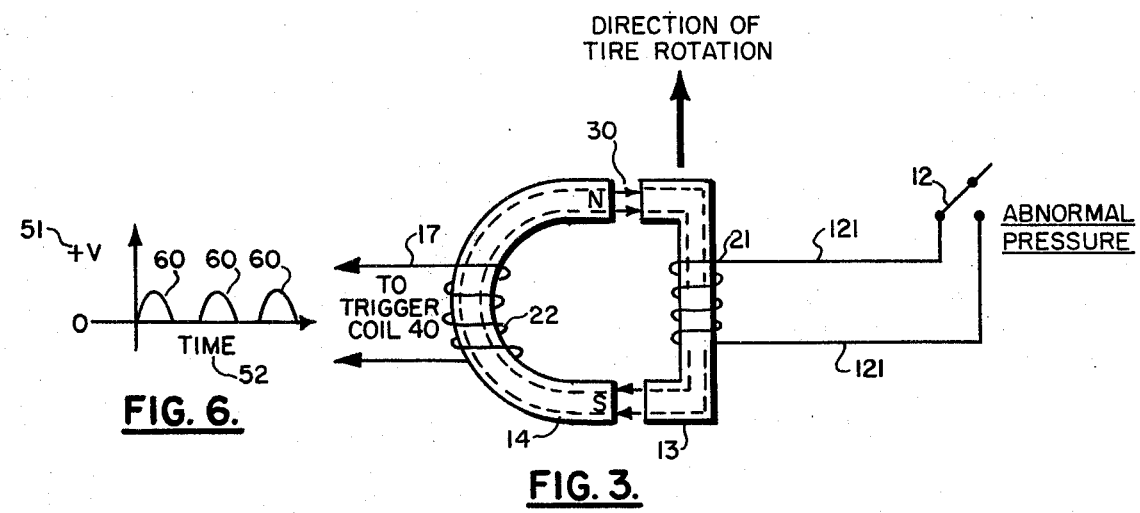

PNEUMATIC PRESSURE MONITORING SYSTEM

BACKGROUND OF THE INVENTION

The present invention relates to a tire pressure monitoring device and method for monitoring, for example, pneumatic pressure in automobile tires for low and high preset values of pressure for the tires. The present invention has been found to be particularly useful in the automobile pneumatic tire pressure monitoring art, especially as a system for monitoring the pneumatic pressure in any size tire for low pressure, and hence will be discussed with particular reference thereto. However, the present invention is applicable to many other types of tires as well, not only automobile tires, as long as pneumatic tires are used to support the vehicle (one or more tires), and the term "automobile" is used herein to include vehicles of all sorts such as airplanes, tractors, and trucks.

In the monitoring of any type of pneumatic tire for pressure over or under a preset limit, pressure monitoring means is usually attached in some way to the rotating pneumatic tire to permit fluid motion from the air or other inflating gas in the pneumatic tire to the pressure monitoring means. Therefore, additional means must be included to transfer the information obtained by the pressure monitor means to alarm circuit means which would be used to alter the vehicle operator of the high or low pressure. This involves the transference of information by transmission means from the pressure monitor means located on the rotating part of the automibile, the tire, to the non-rotating portion of the automobile where the alarm circuit means is located. This transmission means must be capable of transmitting the signals between the moveable member and the relatively stationary portion of the vehicle in a manner such that environmental factors will not affect the signals transmitted, the device is reliable in operation for a long period of time and consistent in its indication, and vehicle operation is not impeded.

Several types of tire pressure monitoring devices and methods have been known and used before, and typical examples thereof in the pneumatic tire pressure monitoring art are shown in U.S. Pat. No. 3,370,459, issued Feb. 27, 1968 to A. Cescati, U.S. Pat. No. 3,523,450, issued Aug. 11, 1970 to A. Openshaw et al, U.S. Pat. No. 3,421,144, issued Jan. 7, 1969 to E. G. Bustos, U.S. Pat. No. 2,846,664, issued Aug. 5, 1968 to H. J. Amundsen, Jr., et al, U.S. Pat. No. 1,851,978, issued Apr. 5, 1973 to W. H. Dinger, U.S. Pat. No. 3,662,335, issued May 9, 1972 to K. Fritze, U.S. Pat. No. 3,691,524, issued Sept. 12, 1972 to H. Frost, et al, U.S. Pat. No. 3,713,092 issued Jan. 23, 1973 to B. Ivenbaum, U.S. Pat. No. 2,070,743 issued Feb. 16, 1937 to J. W. McDonnell, U.S. Pat. No. 3,588,814, issued June 28, 1971 to T. Furlong, and U.S. Pat. No. 3,665,387 issued May 23, 1972 to R. S. Enabnit.

The Cescati, Amundsen, Openshaw, Dinger, and Bustos tire pressure monitor devices utilize electric brush means to transmit signals from pressure monitor means, such as pressure switches, position plunges, and differential switches to alarm circuit means. However, these techniques are inherently unreliable because of mechanical aspects involved in the coupling such as brush wear and contamination in slip ring type systems.

The Fritze and Ivenbaum devices require, at least in part, active devices requiring continuous power in the rotating member, the tire, of the vehicle transmitting either a radio signal or an oscillator signal to another receiver or coupling device located on the vehicle frame. However, this type of prior art is difficult to implement inside the tire because the power supply inside the tire or at the stem of the tire needs to be installed securely and the wearing out of the power supply, either mechanically if it is self generated by the rotation of the wheel or by decay of a self-contained power supply such as a battery, over a period of time. This, of course, presents inherent unreliabilities with the devices, as well as cost in implementation and maintenance, and the operator will lack confidence in the integrity of the system.

The Frost and Furlong pressure monitoring devices use a type of magnetic coupling means to transmit the signal from the pressure monitoring means to the alarm circuit means. The Frost and Furlong devices use counting means in their magnetic coupling to couple the information from the pressure monitoring means to the alarm circuit means, counting the number of revolutions per wheel to determine tire speeds which can be related to the pressure in the tire. The Frost device requires complex electronic circuitry to perform the count in order to avoid false signals such as would develop from turning. This electronic circuitry, which is subject to shock from the vehicle when it bounces and other hostile environmental factors, yields failure rates that will be much higher than a very simple coupling device. The Furlong device uses a reed relay to count revolutions, which is, therefore, subject to failure since the relay will close every revolution, and compares speed between tires. This prevents distinguishing low tire pressure if all tires were low, and the device also has no circuitry means for distinguishing one tire slowing down in comparison to the others because of turns, etc. It is also therefore inherently unreliable because of its mechanical coupling for the transmission means for the reed relay and other system defects that would require additional circuitry which will also make it unreliable from a complexity standpoint. Readings therefore would result in anomolous indication and a lack of confidence in the integrity of the system by the operator.

The Snabnit, McDonnell, and Fritze tire pressure monitoring devices also use magnetic coupling means between the pressure monitoring means and the alarm circuit means. They either use a pressure switch or pressure diaphram changing the core of a coil from air to a ferrous metal to indicate changes in the pneumatic pressure. The pressure monitor means magnetically couples to the alarm detection circuit means through an oscillator portion of the circuit. However, the circuit is complex so that environmental factors affect the transmitted signal, and, therefore, the circuit lacks reliability because of the complexity of the circuit resulting in anomolous indication and a lack of confidence in the integrity of the system, or the circuit is also provided with self-diagnosing circuitry which makes the circuit even more complex and subject to additional problems of integrity of the system, making them expensive to manufacture and to maintain.

It is, therefore, desired in the pneumatic pressure monitoring art to provide coupling means between the rotating tire and the relatively stationary portion of the vehicle which requires no power source or active components on the movable tire, which is very reliable, which is immune to the effect of the environment, and which is sufficiently sure in reporting to provide reliable and consistent alarm means for pressure changes in the tire.

GENERAL DISCUSSION OF PRESENT INVENTION

In contrast to the prior art having the problems of reliability, maintainability, expense, need for regulated power supply source, complex circuitry and environmental security, the present invention uses a very simple but highly effective design to magnetically couple the pressure monitoring means to the alarm circuit means. The present invention, while utilizing pressure monitor means such as a pressure switch and ferrous core means wound with an electric coil to transmit the readings of the pressure monitoring means, both located on the rotating tire portion of the vehicle, utilizes the principal of Lenz's Law that the emf induced or generated in a circuit by any change in the system emf will establish a current in the circuit in such a direction to oppose the change in the action that produces the emf. See page 206 of *Principals of Electric and Magnetic Circuits* by Boast, 2nd edition, published by Harper and Brothers. It utilizes this principal to detect changes in the pressure monitoring means such as, for example, a pressure which to transmit this information by magnetic coupling from the pneumatic tire to the relatively stationary portion of the vehicle.

The present invention uses pressure monitoring means such as, for example, a pressure switch and electrical conduction means such as, for example, a wire to transmit open and closure of the pressure monitoring means upon high or low pressure detections to ferrous core means mounted on the wheel hub which is a portion of the rotating wheel. Usually the pressure of the tire in the normal pressure range for the pneumatic tire will keep the pressure monitoring means such as, for example, a normally open pressure switch, in the closed position. As the tire rotates, the ferrous core means will, for every cycle of the wheel, come into a position which directly faces, at very close air gap distances, the permanent magnet means mounted on the axle of the wheel and facing the ferrous core means with a coil of wire wound around the permanent magnet means to transmit any voltage signals generated by the permanent magnet means to the alarm circuit means. In use, the ferrous core means, without the electrical conduction means and pressure monitoring means in a closed position, would complete a magnetic flux path for the permanent magnet means which had, prior to the rotation bringing the ferrous core means in direct facing with the permanent magnet means, only an air gap to complete the magnetic circuit. Therefore, when the ferrous core means comes into position facing the permanent magnet means, a change in flux linkage will be experienced by the permanent magnet means. This will induce the voltage signal in the coil would around the permanent magnet means for the period of time that the ferrous core means is physically facing the permanent magnet means, which is the time between the time when it first begins to face the permanent magnet means as a result of rotation until the time it ceases to face the permanent magnet means as a result of rotation of the tire. This signal would be induced only when the pressure switch opened as a result of over or under pressure. During all other times, when the ferrous core means faced the permanent magnet means, the change in magnetic flux through the ferrous core means would be resisted, because the electrical conduction means would be in a closed state permitting current to flow in the coil wrapped around the ferrous coil means to induce magnetic flux opposite and equal to the magnetic flux induced by the permanent magnet means, as a result of Lenz's Law, thereby inhibiting any significant voltage from being produced in the coil wrapped around the permanent core means.

Also as a result of the ease of implementation of this induction system, simple and reliable relay or solid state circuit means can be employed to detect the change in voltage and, if necessary, filter the change over several cycles before signaling the operator through relay or other circuit means of the pressure condition.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein:

FIG. 2 is a simplified diagram of the electrical circuit and magnetic coupling means of the preferred embodiment of the tire pressure monitoring system of the present invention in a normal pressure condition.

FIG. 3 is a simplified diagram of the electric circuit and magnetic coupling of the preferred embodiment of the tire pressure monitoring system of the present invention for under or over pressure conditions.

FIG. 5 is a typical graph of voltage versus time of the output voltage of the electrical coil wound around the permanent magnet means of the preferred embodiment of the tire pressure monitoring system of the present invention under normal pressure conditions.

FIG. 6 is a graphic representation of the typical output voltage of the electrical coil wound around the permanent magnet means of the preferred embodiment of the tire pressure monitoring system of the present invention for under or over pressure conditions.

DETAILED DESCRIPTION OF THE PREFERRED EMBODIMENT

-Introduction-

The pressure monitoring system of the present invention can be used to monitor for example low pressure in an automobile wherein it is important that the pressure be monitored in a repeatable and reliable manner with a system that is easy to install and maintain. Indeed, a particularly important (but not exclusive) application of the present invention is in the monitoring of low pneumatic pressure in tires for automobiles using a pressure switch, and therefore the preferred embodiment will be described with respect to such an application. However, it should be realized that the present invention could be applied to, for example, any application where it is desired to transmit from one location to another the fact or data that an abnormal pressure exists wherein there is relative movement between the locations, although such other applications are not as preferred as the automobile application.

-Structure and Operation-

Figure 1:
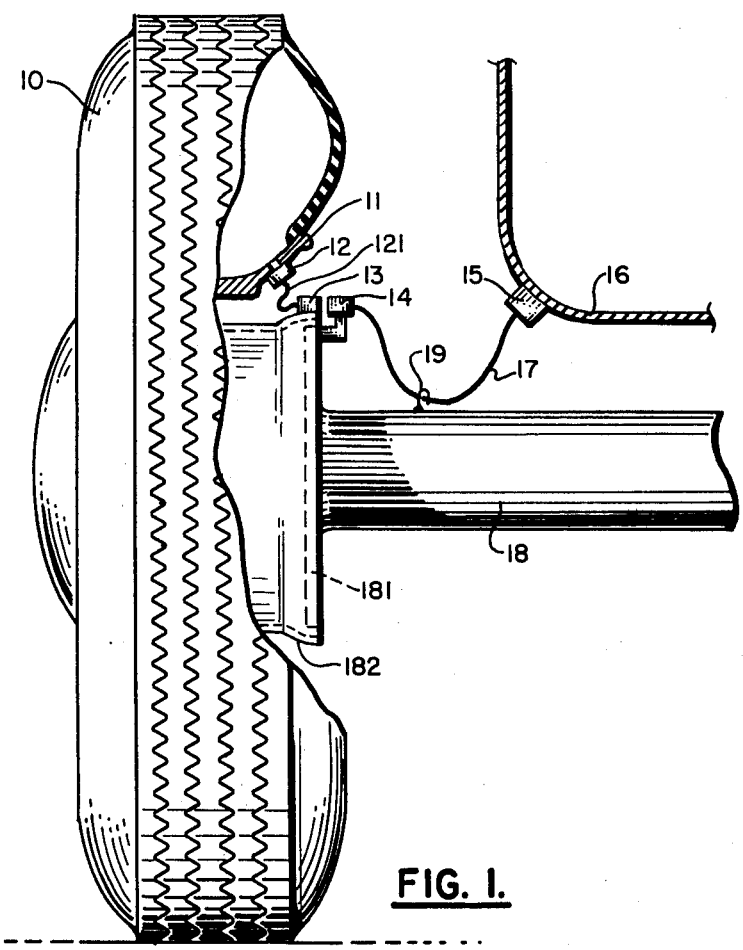
FIG. 1 is a frontal view of a wheel, with the tire partially cut away, and brake drum assembly showing the tire in place using the preferred embodiment of the tire pressure monitoring system of the present invention showing said system installed.

Referring to FIG. 1, there is shown a pressure monitoring means in the form of a pressure switch 12 connected to the tire rim 11 which forms a portion of the tire structure 10, the tire 10 being shown in the inflated condition. The pressure switch 12 is electrically connected by electrical conduction means 121 such as, for example, a pair of wires to a ferrous core means 13 such as, for example, a soft iron core in a half toroidal shape having the electrical conduction means 121 wrapped around it as a coil 21 (note FIGS. 2 & 3). The ferrous core means 13 is connected to the brake drum and wheel hub assembly 182 which rotates with the tire 10, as does the pressure switch 12.

Permanent magnet means 14 such as, for example, a half toroidal shaped permanent magnet (note FIGS. 2 & 3) is mounted on the back plate assembly 181, which is connected to the axle 18 of the wheel and is a stationary part of the vehicle. The permanent magnet means 14 is mounted in such a manner that the faces of the toroid are mounted parallel to and in very close proximity to the ferrous core means 13 when the ferrous core means 13 rotates into position facing permanent core means 14 as illustrated in FIGS. 1 – 3.

With this set-up as explained more fully below, tire pressure changes produce variations in the magnet flux within permanent magnet means 14, thus providing a signal from the tire 10 to an induction pick-off coil 22 wrapped around the permanent magnet means 14. With reference to the exemplary sensing and indicating circuit diagram of FIG. 4, this signal in turn provides a signal to the reed switch means 15 which can be, for example, a magnetically activated reed switch 41. However, it is noted that, in order for the induction pick-off coil 22 to generate a signal voltage, the magnetic flux within the permanent magnet means 14 must change with respect to time. Therefore, the system monitors pressure only when the vehicle is in motion.

Usually, when the vehicle is stationary or when it is in motion, the permanent magnet means 14 "sees" a constant air gap as part of its magnetic circuit. However, when the ferrous magnetic core means 13 is positioned by tire rotation in close proximity to the permanent magnet means 14, it allows a rapid increase in magnetic flux to be built up through the relatively low reluctance core path of the ferrous core means 13. At such a position only a small air gap exists between the ferrous core means 13 and the permanent magnet means 14, which can be typically one-eighth of an inch.

When the pressure in the tire 10 is normal, the pressure switch 12 is closed (note FIG. 2) thereby forming a closed electrical loop with the pressure switch 12, electrical conduction means 121, and the coil 21 around the ferrous core means 13. Therefore, as magnetic flux 20 begins to increase in the ferrous core means 13 due to the magnetic coupling between it and the permanent magnet means 14, the coil 21 wound around the ferrous core means 13 will develop a current which, in turn, however develops a magnetic field to resist the initial flux 20 provided by the permanent magnet means 14 in accordance with Lenz's Law. Thus the resultant or net change in magnetic flux 20, when the pressure monitoring switch means 12 is closed, therefore, is almost canceled except for a very small transient, resulting in only a small signal being generated from the pick-off coil 22 wound around the permanent magnet means 14. This small transient voltage 50 graphically illustrated in FIG. 5, is by design of too too small a magnitude 51 to excite the alarm circuit means 15 through the electrical conductor means 17. (It is noted that the electrical conductor means 17 can be merely electrical wires anchored to the axle 18 by clasp means 19 as illustrated in FIG. 1).

If the pressure monitor means 12 detects an under pressure, or other abnormal condition in the tire 10 which causes the pressure monitor means 12 to open (note FIG. 3), the electric circuit formed by the pressure monitor means 12, the electrical conduction means 121 and the coil means 21 wound around the ferrous core means 13 is broken. Then, as the permanent magnet means 14 and the ferrous core means 13 face each other as a result of tire 10 rotation, the magnetic flux 30 will continue to build in the ferrous core means 13 because it then has a very low reluctance in comparison to air. This causes a net magnetic flux 30 change in the permanent magnet means 14, because there is then no current in the coil 21 wound around the ferrous core means 13 to oppose the magnetic flux 30 build-up.

Therefore, as graphically illustrated in FIG. 6, an electromotive force 60, which varies over time 52 as the ferrous core means 13 rotates into facing position with the permanent magnet means 14 and the roates out of position again, will be induced as a result of the change in the magnetic flux 30 in accordance with Faraday's Law of Induction (see *Mechanical Engineers Handbook* by Lionel S. Marks, 5th edition, McGraw-Hill, 1951, p. 1949). The same reference reveals that Faraday's Law may be approximated as:

$$E = - \frac{N \Delta V}{\Delta T} 10^{-8},$$

where $E$ is the induced emf, $N$ is the number of turns of the pick-off coil 22, $\Delta V$ is the change in magnetic flux, and $\Delta T$ is the time interval of flux change. As illustration, for a tire with a 25 inch diameter and a 10 inch wheel hub diameter, the monitor will generate a voltage pulse 60 with a maximum peak of approximately .77 volts; i.e.:

$$E = - \frac{(250)(400)}{1.3 \times 10^{-3}} 10^{-8} \text{ volts} = .77 \text{ volts},$$

where 250 would be a typical number of turns of the pick-off coil 22, four hundred is the change in lines of magnetic flux for typical permanent magnet means capable of producing a flux density of eight hundred gauss as a result of being suddenly exposed to a lower reluctance, and $1.3 \times 10^{-3}$ sec. is the approximate time that the ferrous core means and permanent magnet means face each other for a 10 inch wheel hub, a ferrous core width of 0.5 inches and a vehicle speed of 60 mph.

The emf amplitude 51 is a number varying in time 52 and is dependant upon the field strength 30 of the permanent magnet means 14 as presented to ferrous core means 13, the characteristics (reluctance) of the ferrous core means 13, and the radial velocity of the tire 10.

Figure 4:
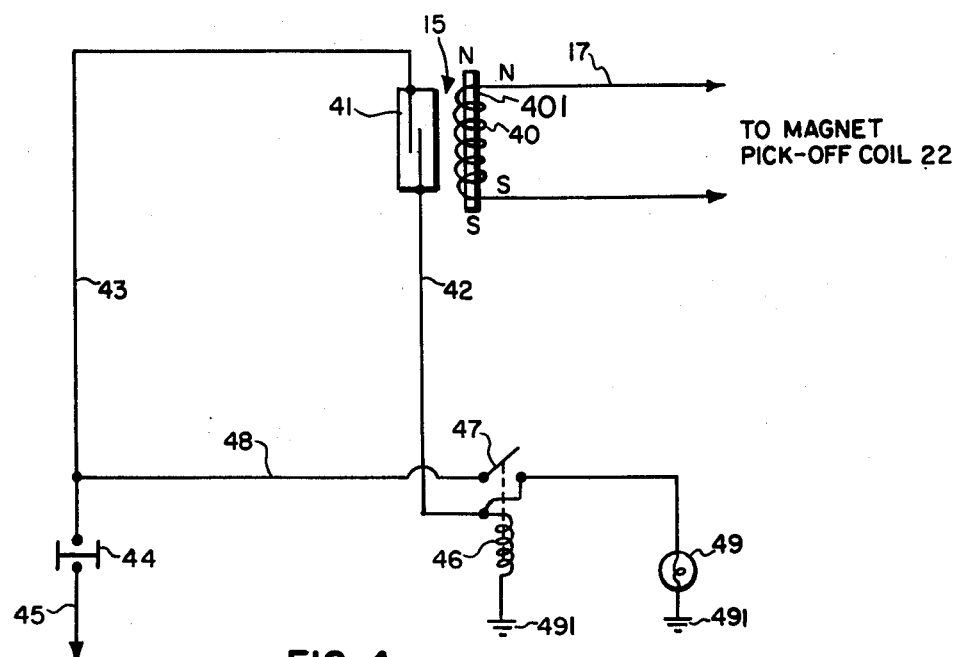
FIG. 4 is a simplified diagram of the alarm circuit means of the preferred embodiment of the tire pressure monitoring system of the present invention.

The power from voltage pulse 60 developed across the pick-off coil 22 is transmitted by electrical conductor means 17 to the alarm circuit means 15, as illustrated in FIG. 4. The power is by design sufficient in cooperation with the ferrous coil means 40 to close reed switch 41, which includes a permanent magnet core 401, while as noted above the power from voltage pulse 50 by design is not.

The closing of reed switch 41 completes an electrical circuit between voltage source 45 through power switch 44 which is closed through electrical conductor means 43 through reed switch means 41 through electrical conductor means 42 through latching relay means 46 to ground means 491 which is connected to voltage source means 45. Latching relay means 46 pulls in latching relay contact 47, causing current to flow through alarm light 49 from voltage source 45 to ground 491. The alarm circuit of FIG. 4 will by design stay closed even after the alarm condition for an abnormal pneumatic pressure ceases to exist and pressure monitor means 12 is again closed, until power switch 44 is reset. This resetting opens the circuit from voltage source means 45 to the alarm light 49, momentarily releasing the alarm circuit means by releasing latching relay 46, thereby interrupting current flow to the alarm light 49.

It is noted that the alarm circuit of FIG. 4 is designed for D. C. battery operation, which of course is the common source of power available in an automobile. However, by merely changing the laching relay 46 to an appropriate AC relay, an AC power source could be utilized as is well known in the art.

Thus in summary the preferred embodiment of the present invention provides a system for monitoring air pressure in for example automotive tires dynamically by utilizing a small magnet exposed to a variable reluctance gap in its magnetic circuit. The only moving parts are small rugged switches (other than normal tire rotation) which move only on a change of air pressure.

The system monitors air pressure within predetermined limits by sensing a tire pressure change and by varying a magnetic flux when the tire pressure goes from a normal state to an abnormal state or from an abnormal to normal. This provides a signal from the tire to an induction pick-off coil (mounted, for example, on the brake assembly back plate) which in turn provides a signal in terms of, for example, a warning light or other alarm, including audible ones, to the vehicle operator. In order for the induction pick-off coil to generate a signal voltage, the magnetic flux must change with respect to time, therefore, the system monitors pressure only while the vehicle is in motion.

The basic elements of the preferred embodiment primarily consists of: (1) a permanent magnet capable of producing a sufficient flux density and being, for example, wound with wire to provide a pick-up coil; (2) a ferromagnetic core consisting of for example a laminated ferromagetic material (such as a portion of a power transformer core) to provide a low reluctance path for magnetic flux of the permanent magnet, the core also being wound with wire; and (3) a pressure switch that senses tire pressure changes and accordingly controls the induced current in the ferromagnetic core. These elements provide the basic transmission system for transmitting the pressure data from the moving wheel location to the relative stationary vehicle location. In association with an appropriate sensing and indicator circuit, the status of the pressure level can be made known to the operator.

With the vehicle in motion, the permanent magent (mounted for example on the brake assembly back plate) sees a constant air gap until the core (attached for example to the brake drum) is positioned by tire rotation to allow a rapid increase in flux through the low reluctance core path across a small air gap. As the resultant flux starts to build up through the core, the coil wound around the core develops a current when the pressure sensing circuit is closed (normal condition) which, in turn, develops a magnetic flux (in accordance with Lenz's Law) to resist the initial flux provided by the permanent magnet. The resultant change in flux from the magnet is therefore, cancelled with no signal being generated from the pick-off coil wound around the magnet.

However, in the event an under-pressure condition exists, the pressure sensing circuit is opened, opening the coil circuit around the ferromagnetic core. Thus, no current and therefore no resisting magnetic flux is then developed. The initial magnetic flux then is not cancelled and will cause a signal to be generated in the pick-off coil which in turn sends a signal to trigger, for example, a magnetic reed switch, thus causing a suitable indicator such as an alarm light to energize.

Although the system as described in detail supra has been found to be most satisfactory and preferred, different applications and many variations in its elements and the structure of its elements are, of course, possible. For example, the system of the present invention can be used to indicate the presence of high or over pressure in pneumatic tires, or to detect both over pressure and under pressure. Moreover, the device of the present invention can be mounted on a disk brake as well as a drum brake. Additionally, permanent magnet means may be generated as a result of an electromagnet. Also, pressure monitoring means may have tire inflating means attached thereto. Moreover, the alarm circuit could include filtering means to require several voltage pulses from the pick-off coil before alerting the operator. Additionally, the alarm circuit could be varied by using a trigger coil and a biasing coil, either with adjustable or fixed bias dependent on the reed relay used, with the trigger coil used to close the reed switch and the biasing coil used to keep the reed switch closed thereby eliminating the need for the latching relay. Also, solid state circuitry such as, for example, a voltage comparator or silicon controlled rectifier can be used to turn the alarm light on. Moreover, by duplicating the components of the system, the pneumatic pressure monitoring system could be used for as many tires with individual alarm lights or groups of tires with a common alarm light or combination thereof as is desired.

The above are, of course, merely exemplary of the possible changes or variations.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A tire pressure monitoring system for a pneumatic tire, said tire being mounted on the rotating part of a wheel assembly of a vehicle or testing assembly wherein the rotating tire is to have its pneumatic pressure continuously monitored by pressure monitoring means mounted on said tire, wherein pressure changes from normal to abnormal and abnormal to normal produce detectable changes in condition of said pressure monitoring means and wherein it is desired to transmit said changes from said pressure monitoring means to the relatively stationary part of said vehicle or said testing assembly, comprising the following interconnected electrical and mechanical components:

electrical conduction means for transmitting said change in condition of said pressure monitoring means; said electrical conduction means being mounted on said rotating part of the wheel assembly and connected to said pressure monitoring means;

magnetic coupling means using only the law of electromagnetics known as Lenz's Law for magnetically transmitting one of said changes in condition of said pressure monitoring means for said rotating part of the wheel assembly to the stationary part of said vehicle or testing assembly; said magnetic coupling means being composed of two parts magnetically coupled to each other at each revolution of said rotating portion of said wheel assembly with the first of said parts mounted on said rotating portion of said wheel assembly and electrically connected to said electrical conduction means and with the second of said parts mounted to said stationary part of said vehicle or said testing assembly;

emf conduction means for transmitting said change in condition of said pressure monitoring means from said magnetic coupling means; said emf conduction means being mounted on said stationary part of said vehicle or said testing assembly and electrically connected to said second part of said magnetic coupling means; and circuit sensing and indication means for sensing said change in condition of said pressure monitoring means from the normal to the abnormal condition transmitted by said second part of said magnetic coupling means and indicating said change to the operator of said vehicle or said testing assembly; said circuit sensing and indication means being mounted on said stationary part of said vehicle or said testing assembly and electrically connected to said emf conduction means.

2. The system of claim 1 wherein:
said first of said parts of said magnetic coupling means is comprised of -
first electrically conductive wire means for suppressing or permitting magnetic paths; and
ferrous core means for completing magnetic paths, said first wire means forming a coil around said ferrous core;
said ferrous core means is mounted to face said second part of said magnetic coupling means in such a manner that the magnetic circuit is completed between said parts of said magnetic means when they face each other during each cycle of said rotating part of said wheel assembly; and
said electrically conductive wire means is electrically connected to said electrical conduction means.

3. The system of claim 2 wherein said ferrous core means is a soft iron half toroid.

4. The system of claim 1 wherein:
said second of said parts of said magnetic coupling means is comprised of - electrically conductive wire means for transmitting induced electromotive force to said circuit sensing, and indication means, and
permanent magnet means for deteting magnetic circuit completion by said ferrous core means, said second wire means forming a coil around said permanent magnet means;
said permanent magnet means is mounted to face said first part of said magnetic coupling means so that a magnetic circuit is completed between said parts of said magnetic coupling means when they face each other during each cycle of said rotating part of said wheel assembly; and
said second wire means is electrically connected to said emf conduction means.

5. The system of claim 4 wherein said permanent magnet means is a permanent magnet in the shape of a half toroid.

6. The system of claim 1 wherein said second of said parts of said magnetic coupling means is comprised of: electrical conduction means connected to said emf means for transmitting induced electromotive force to said circuit sensing and indication means and electromagnetic means for detecting magnetic circuit completion by said first of said parts;
said electromagnetic means mounted to face said first part of said magnetic coupling means so that a magnetic circuit is completed between said parts of said magnetic coupling means when they face each other during each cycle of said rotating part of said wheel assembly.

7. The system of claim 1 wherein said emf conduction means is a pair of electrically conductive wires.

8. The system of claim 1 wherein said circuit sensing and indication means includes circuit sensing means for detection of the presence of electromotic force signaling the change in condition of the pressure monitoring means from the normal to the abnormal condition, and alarm indication means for alerting the operator, and further includes reset means for resetting said alarm indication means; said alarm indication means being electrically connected between said reset means and said circuit sensing means; said circuit sensing means being electrically connected to said emf conduction means.

9. The system of claim 8 wherein said circuit sensing means is comprised of relay means and trigger coil means which actuates said relay means when sufficient energy is supplied to said circuit sensing means by said emf conduction means.

10. The system of claim 9 wherein said relay means is a reed switch.

11. The system of claim 8 wherein said alarm indication means is comprised of voltage source means for powering said alarm indication means, latching relay means to sustain the alarm indication until reset by said reset means, alarm light means for giving a visual indication, and power conduction means for transmitting power between said voltage source means and said alarm light means; said power source means being electrically connected between said circuit sensing means and said reset means; said latching relay means being connected between said circuit sensing means and said light means and said power conduction means; and said light means being physically mounted in the location in said vehicle or said testing assembly where the operator is located.

12. The system of claim 11 wherein said reset means comprises manual switch means for breaking the connection between said power source means and said power conduction means.

13. The system of claim 1 wherein said abnormal pressure is low pressure.

14. The system of claim 1 wherein said pressure monitoring device is a pressure switch.

15. A system for signaling conditions between moveable and relatively stationary members, wherein changes in state of conditions to be measured produce detectable changes in condition in monitoring means mounted on either said moveable or said relatively stationary member and mounted on the member where said conditions are to be measured, comprising the following interconnected electrical and mechanical components:

- electrical conduction means for transmitting said change in condition of said monitoring means; said electrical conduction means being mounted on either said moveable or said relatively stationary member and mounted on the member where said conditions are to be measured and connected to said monitoring means;
- magnetic coupling means using only the law of electromagnetics known as Lenz's Law for magnetically transmitting one of said changes in condition of said monitoring means from said moveable member to said stationary member if said conditions are to be measured on said moveable member, or from said stationary member to said moveable member if said conditions are to be measured on said stationary member; said magnetic coupling means being composed of two parts magnetically coupled to each other at least once during the movement of said members with the first of said parts mounted on the member where said conditions are to be measured and electrically connected to said electrical conduction means and with the second of said parts mounted on the member that the first of said parts is not mounted on;
- emf conduction means for transmitting said change of condition of said monitoring means; said emf conduction means being mounted on the same member as said second part of said magnetic coupling means and electrically connected to said second part of said magnetic coupling means; and
- circuit sensing means for sensing said change in condition of said monitoring means transmitted by said second part of said magnetic coupling means and producing a control signal for use by other devices; said circuit sensing means being mounted on the same member as said emf conduction means and electrically connected to said emf conduction means.

16. The system of claim 15 wherein there is further included indication and reset means for visually or audibly indicating said change in condition transmitted by said second part of said magnetic coupling means and resetting said indication; said indication and reset means being mounted on the same member as said circuit sensing means and electrically connected to said circuit sensing means.

* * * * *